US009579796B2

(12) United States Patent
Nagarajan et al.

(10) Patent No.: US 9,579,796 B2
(45) Date of Patent: Feb. 28, 2017

(54) AUTOMATIC TASK-SPECIFIC MODEL REDUCTION FOR HUMANOID ROBOTS

(71) Applicant: DISNEY Enterprises, Inc., Burbank, CA (US)

(72) Inventors: Umashankar Nagarajan, Burbank, CA (US); Katsu Yamane, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 346 days.

(21) Appl. No.: 14/037,183

(22) Filed: Sep. 25, 2013

(65) Prior Publication Data
US 2015/0088469 A1 Mar. 26, 2015

(51) Int. Cl.
*G06F 17/10* (2006.01)
*B25J 9/16* (2006.01)

(52) U.S. Cl.
CPC ........... *B25J 9/1671* (2013.01); *B25J 9/1605* (2013.01)

(58) Field of Classification Search
CPC ........ B25J 9/1605; B25J 9/1671; G05B 13/04
USPC ................................. 703/2; 700/29
See application file for complete search history.

(56) References Cited

U.S. PATENT DOCUMENTS

| 2007/0033549 A1* | 2/2007 | Chu | G06F 17/5036 716/30 |
| 2010/0250001 A1* | 9/2010 | Hodgins | B62D 57/032 700/261 |
| 2012/0143374 A1* | 6/2012 | Mistry | B62D 57/032 700/259 |

OTHER PUBLICATIONS

Furusho "A Theoretically Motivated Reduced Order Model for the Control of Dynamic Biped Locomotion" from "Journal of Dynamic Systems, Measurement, and Control, Jun. 1987, vol. 109/155".*
Krishnan et al. "Control of a Single-Link Flexible Beam Using a Hankel-Norm-Based Reduced Order Model" from "1988 IEEE International Conference on Robotics and Automation, Apr. 24-29, 1988".*
R. Blickhan, "The spring-mass model for running and hopping," Journal of Biomechanics, vol. 22, No. 11, pp. 1217-1227, 1989.

(Continued)

*Primary Examiner* — Mohammad Ali
*Assistant Examiner* — Yuhui R Pan
(74) *Attorney, Agent, or Firm* — Patterson + Sheridan, LLP

(57) ABSTRACT

The disclosure provides an approach for automatically determining task-specific robot model reductions. In one embodiment, a simplification application determines a smallest order statespace model whose stabilizing controller also stabilizes a full-order robot model. The simplification application may determine such a model via an iterative procedure in which the reduced order is initialized to the number of unstable poles of the open-loop full-order system and, while the closed loop full-order system with the balanced reduced order system's stabilizing controller is unstable, fractional balanced reduction is applied to generate a balanced reduced system. If one or more unstable closed-loop poles exist in the full-order system with the stabilizing controller of the newly-generated balanced reduced system, the reduced order is incremented by one, and fractional balanced reduction repeated, until no unstable closed-loop poles remain. In another embodiment, the model reduction is made task-specific by formulating the full model with task-specific outputs.

20 Claims, 5 Drawing Sheets

(56) References Cited

OTHER PUBLICATIONS

S. Kajita, F. Kanehiro, K. Kaneko, K Fujiwara, K. Harada, K. Yokoi, and H. Hirukawa, "Biped walking pattern generation by using preview control of zero-moment point," in Proc. IEEE Int'l Conf. on Robotics and Automation, 2003, pp. 1620-1626.

S. Lee and A. Goswami, "Reaction mass pendulum (rmp): An explicit model for centroidal angular momentum of humanoid robots," in Proc. IEEE Int'l Conf. on Robotics and Automation, 2007, pp. 4667-4672.

B. Stephens, "Integral control of humanoid balance," in Proc. IEEE/RSJ Int'l Conf. on Intelligent Robots and Systems, 2007, pp. 4020-4027.

B. Stephens and C. Atkeson, "Modeling and control of periodic humanoid balance using the linear biped model," in Proc. IEEE-RAS Int'l Conf. on Humanoid Robots, 2009, pp. 379-384.

F. Horak and L. Nashner, "Central programming of postural movements: adaptation to altered support-surface configurations," Journal of Neurophysiology, vol. 55, No. 6, pp. 1369-1381, 1986.

A. Goswami, "Kinematic and dynamic analogies between planar biped robots and the reaction mass pendulum (rmp) model," in Proc. IEEE-RAS Int'l Conf. on Humanoid Robots, 2008, pp. 182-188.

K. Yamane, "Systematic derivation of simplified dynamics for humanoid robots," in Proc. IEEE-RAS Int'l Conf. on Humanoid Robots, Nov. 2012.

A. Safonova, J. K. Hodgins, and N. S. Pollard, "Synthesizing physically realistic human motion in low-dimensional, behavior-specific spaces," ACM Trans. on Graphics, vol. 23, No. 3, pp. 514-521, 2004.

S. Kajita and K. Tani, "Experimental study of biped dynamic walking in the linear inverted pendulum mode," in Proc. IEEE Int'l Conf. on Robotic and Automation, 1995, pp. 2885-2891.

M. G. Safonov and R. Y. Chiang, "A schur method for balanced model reduction," IEEE Trans. On Automatic Control, vol. 34, No. 7, pp. 729-733, 1989.

O. G. Meyer, "Fractional balanced reduction: Model reduction via fractional representation," IEEE Trans. On Automatic Control, vol. 35, No. 12, pp. 1341-1345, 1990.

K. Glover, "All optimal hankel norm approximation of linear multi-variable systems and their Linfinity -error bounds," Int'l J. Control, vol. 39, No. 6, pp. 1145-1193, 1984.

M. G. Safanov, R. Y. Chiang, and D. J. N. Limebeer, "Optimal hankel model reduction for nonminimal systems," IEEE Trans. on Automatic Control, vol. 35, No. 4, pp. 496-502, 1990.

\* cited by examiner

AUTOMATIC TASK-SPECIFIC MODEL REDUCTION FOR HUMANOID ROBOTS

BACKGROUND

Field

Embodiments presented herein provide techniques for simplifying models of robots, and, in particular, for automatic task-specific model reduction for robots.

Description of the Related Art

In robot control, simplified dynamics models are often used to represent the robot, as it is difficult to design controllers that control full dynamics models having many degrees of freedom (DOF). Typically, simplified models have fewer DOF than full models and are linearized to apply techniques from linear control theory. Examples of simplified models include the one-joint inverted pendulum model, the two-joint inverted pendulum model, the cart-table model, the inverted pendulum with reaction wheel, the double inverted pendulum, and the linear biped model.

Conventionally, controller developers formulate these simplified models manually based on their intuition. Little work has been done to investigate how well such simplified models match the dynamics of the original, high-dimensional models. Moreover, in addition to the choice of the model, the controller developer must pick two different mappings, one that maps the state of the full model to the reduced state, and another that maps the control inputs of the reduced model to those of the full model. This control input mapping is tricky, as there are infinite possible mappings from a low-dimensional space to a high-dimensional space. Kinetic energy equivalence or angular momentum equivalence are generally used to pick control input mappings.

SUMMARY

One embodiment of the invention provides a computer implemented method for simplifying a robot model. The method generally includes receiving the robot model and a controller, where the received robot model includes one or more equations with mass and dynamic properties of the robot used to simulate motion of the robot and the controller is configured to compute inputs to the received robot model for achieving one or more control objectives. The method further includes receiving task-specific output corresponding to a task or motion to be performed and performing, via one or more processors, a search on an order of the received robot model to obtain a minimum stable reduced order robot model and a first stabilizing controller associated therewith given the received robot model, the controller, and the received task-specific output, where the first stabilizing controller also stabilizes the received robot model.

Other embodiments include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

The appended drawings illustrate only typical aspects of this invention and are therefore not to be considered limiting of its scope, for the invention may admit to other equally effective aspects.

DETAILED DESCRIPTION

Figure 1:
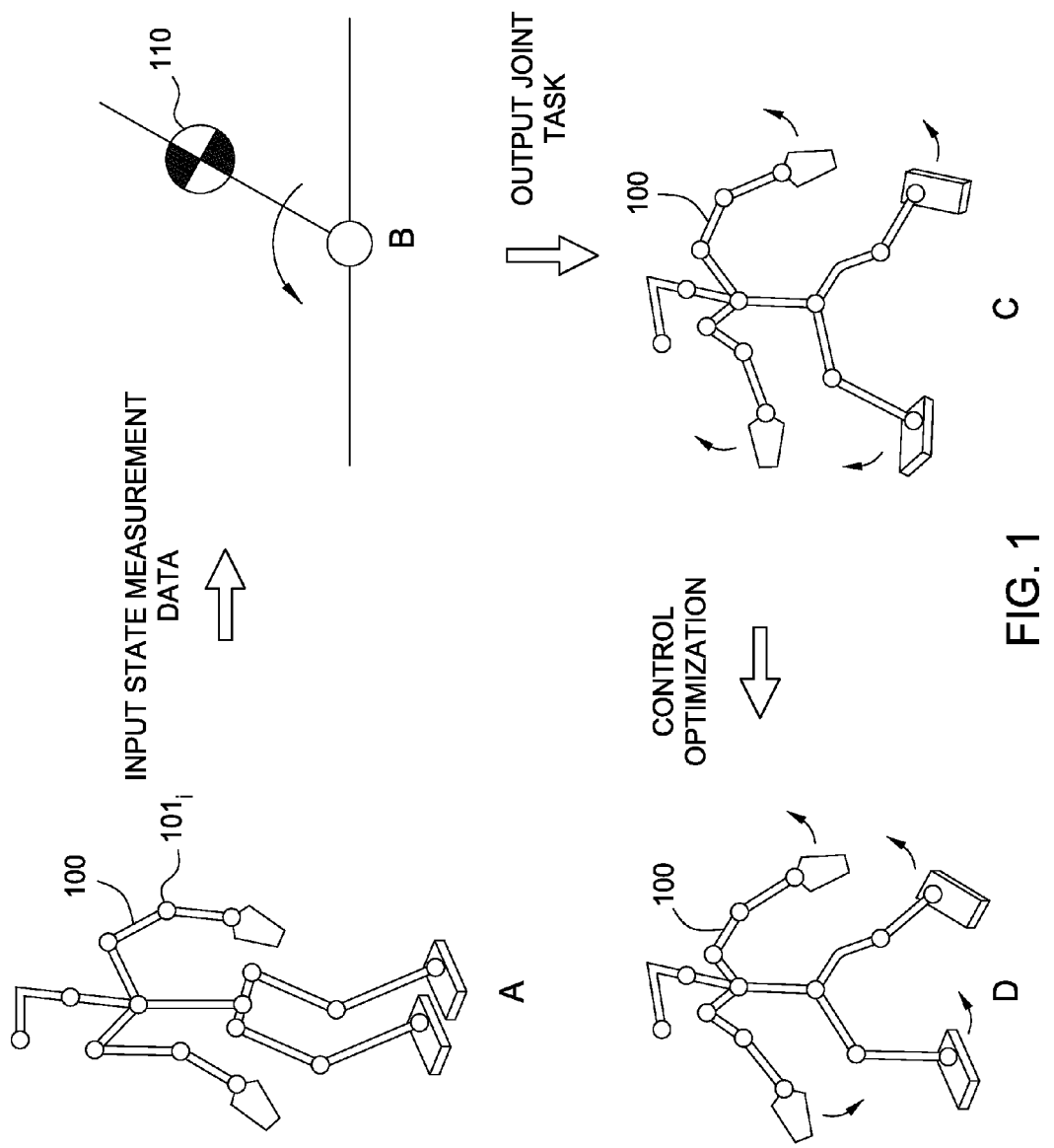
FIG. 1 illustrates an approach for controlling a humanoid robot using a task-specific simplified model, according to an embodiment of the invention.

Embodiments disclosed herein provide techniques for automatically determining task-specific robot model reductions. As used herein, a model includes one or more equations with mass and dynamic properties of a robot, having joint torques as inputs and motion of the robot as output. Techniques disclosed herein permit a model having n states to be simplified to a model having r states, where r is less than n. In one embodiment, a simplification application applies a minimum stable model reduction technique to find the smallest order statespace model whose stabilizing controller also stabilizes the full model. In such a case, the simplification application may determine the minimum stable balanced reduction via an iterative linear search procedure on the order, in which the reduced order is initialized to the number of unstable poles of the open-loop full system and, while the closed-loop full system is unstable, fractional balanced reduction is applied to generate a balanced reduced system. Using the stabilizing controller from the newly-generated balanced reduced system, if one or more unstable closed-loop poles exist in the full-order system, then the reduced order is incremented by one, and fractional balanced reduction repeated, until no unstable closed-loop poles for the full-order system remain. In a further embodiment, the minimum stable model reduction may be made task-specific by formulating the full model with task-specific outputs. Task-specific model reduction is advantageous because, intuitively, complicated robot tasks such as manipulation require higher dimensional reduced order models than do simple tasks such as balancing.

The simplified model may be controlled using a controller which, based on the current state of the simplified model, computes inputs to the model needed to achieve a control objective (e.g., returning to a nominal pose). In one embodiment, the controller may be an infinite-horizon linear quadratic regulator (LQR). Although discussed herein primarily with respect to LQR controllers, techniques disclosed herein may also be adapted to other state-feedback controllers, including, e.g., controllers designed using pole placement. In one embodiment, the LQR controller of the reduced-order model may be used directly to control the full model. In such a case, a full-state observer may collect full-state measurement data of the robot, including joint angles and joint velocities, and a robot control application may then provide such data as input into the reduced-order model, whose output joint task is applied to the robot. Where direct control of the robot is infeasible, the control application may perform control optimization to obtain an actual joint task from the joint task output of the reduced-order model, and apply the actual joint task to the robot. In one embodiment, the control optimization may use quadratic programming to minimize a cost function which includes a cost term that corresponds to the output of the reduced-order model.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. Each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

FIG. 1 illustrates an approach for determining a task-specific simplified model of a humanoid robot, according to an embodiment. As shown in panel A, a robot 100 may include multiple joints $101_i$. Although illustrated as a humanoid robot 100, other types of robots (e.g., other legged robots) may be used as well. Control of such robots may be a challenging task because of its instability and complexity with large numbers of degrees of freedom associated with the joints $101_i$. Such a large number of degrees of freedom may be modeled with a dynamic system having state vector $x \in \mathbb{R}^n$, input vector $u \in \mathbb{R}^m$, and output vector $y \in \mathbb{R}^p$. In such a case, the state space equations are given by:

$$\dot{x} = Ax + Bu,$$

$$y = Cx, \quad (1)$$

where $A \in \mathbb{R}^{n \times n}$, $B \in \mathbb{R}^{n \times m}$, and $C \in \mathbb{R}^{p \times n}$. Further, the dynamic system's output transfer function is given by $G(s) = C(sI_n - A)^{-1}B$, where $I_n$ is a n×n identity matrix.

A reduced-order system with fewer states $x_r \in \mathbb{R}^r$ with r<n but with the same inputs and outputs is given by:

$$\dot{x}_r = A_r x_r + B_r u$$

$$y = C_r x_r, \quad (2)$$

where $A_r \in \mathbb{R}^{r \times r}$, $B_r \in \mathbb{R}^{r \times m}$, and $C_r \in \mathbb{R}^{p \times r}$. The output transfer function of such a reduced-order system is given by $G_r(s) = C_r(sI_r - A_r)^{-1}B_r$, where $I_r$ is a r×r identity matrix. The objective of model reduction is to find a reduced-order model such that the infinity norm of the transfer function of the reduced system and the original system $\|G - G_r\|_\infty$ is minimized.

Panel B illustrates an example reduced-order model 110 having one degree of freedom. Although shown as having one DOF, i.e., two states, the number of states may generally be r, where r is less than n, the number of states of the original model. In one embodiment, the reduced-order model may be generated according to a minimum stable balanced reduction method which finds a minimum reduced order $r_{min}$ such that an LQR that stabilizes the corresponding reduced system also stabilized the original full system. The minimum stable balanced reduction method may be an iterative linear search procedure on the order, which begins with initializing the reduced order r to the number of unstable poles of the open loop system {A, B, C}. At each iteration of r, the system {A, B, C} is reduced via a fractional balanced reduction technique to a reduced-order system {$A_r$, $B_r$, $C_r$} having order r, an LQR control matrix is obtained by solving a Riccati equation, and the number of unstable closed-loop poles of the full-order system {A, B, C} determined. Additional iterations are performed, with the order r incremented by 1 at each iteration, if the number of closed-loop poles is nonzero. The minimum stable balanced reduced model generated by such a method may have the same inputs and outputs as the original, full system.

In a further embodiment, a task-specific minimum stable balanced reduced model may be generated based on task-specific output. The user may specify a desired output matrix or physical parameters (e.g., a desired center of mass) from which the output matrix may be automatically calculated. More complicated robot tasks like manipulation require higher-dimensional models than simpler tasks such as balancing. By inputting such task-specific output to the minimum stable balanced reduction method, the simplification application may generate minimum stable balanced reduced models which are better suited for the desired tasks.

To control robot 100 movement, an observer, which may be designed using, e.g., pole-placement techniques, may provide full-state measurement data of the robot 100, including joint angles and joint velocities. A robot control application may then input such data may into the reduced-order model. Since the reduced-order model may have the same control inputs as the full model, a LQR controller of the reduced-order model may be used directly to control the full model. Sometimes, direct control of the nonlinear simulation of the humanoid robot may not succeed. For example, if the reduced models are obtained by using only a subset of the robot states as outputs, the controllers designed to stabilize these models may outweigh some robot states over another, which results in poor tracking of reference trajectories for the individual joints. Further, the controllers may produce excessive or insufficient contact forces in the feet, and also generate non-zero contact acceleration of the feet. To overcome these issues, the robot control application may perform control optimization to find joint torques and contact forces that satisfy desired constraints and also achieve the desired task, converting the joint task output by the reduced-order model 110, shown in panel C, to an actual joint task then applied to the robot 100, as shown in panel D. The control optimization may include using quadratic programming to minimize a cost function which includes a cost term corresponding to an output of the simplified robot model.

Figure 2:
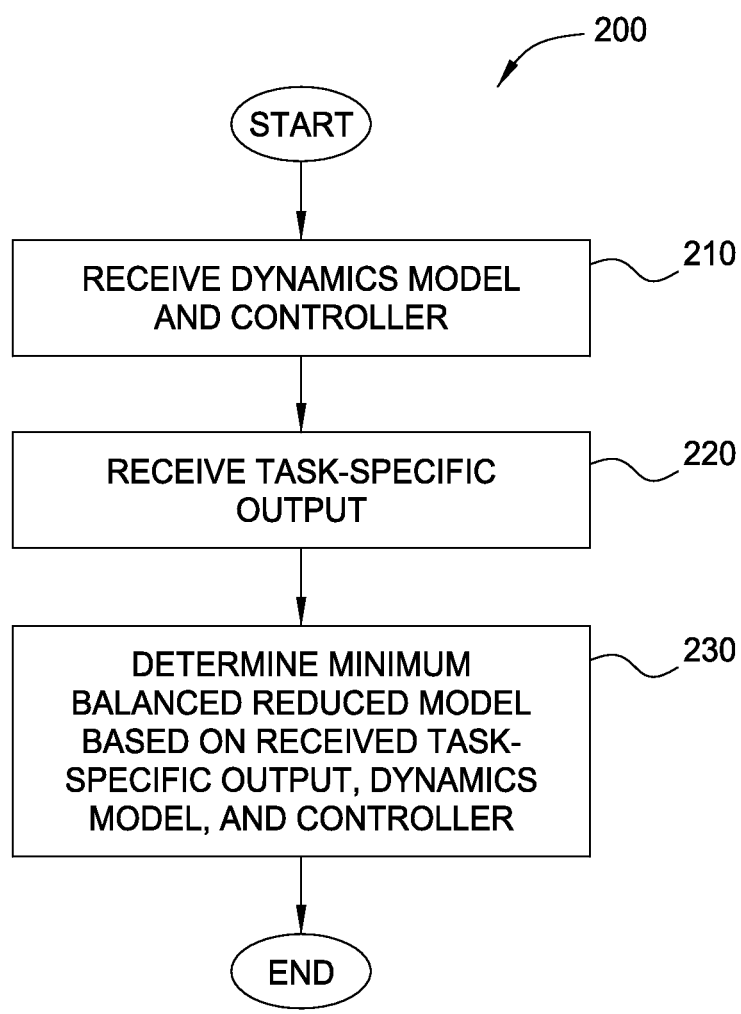
FIG. 2 illustrates a method for determining a task-specific simplified robot model, according to an embodiment of the invention.

FIG. 2 illustrates a method 200 for determining a task-specific simplified robot model, according to an embodiment. As shown, the method 200 begins at step 210, where a simplification application receives a full dynamics model and the controller of the system. The full dynamics model may be specified by, e.g., its state-space matrices. The controller may be specified as, e.g., a LQR gain matrix on the full states or closed-loop poles and pole placement. In a particular example, the model comprises a humanoid robot model having 34 DOF with 7 DOF for each of its legs, 6 DOF for its torso, 4 DOF for each of its arms, and 6 DOF for its root joint, which is unactuated unlike the remaining 28 DOF which are actuated. In one embodiment, the humanoid model may be constrained to not move its feet, with six constraints for each foot. In such a case, the linear equations of motion of the system with the configuration vector $q \in \mathbb{R}^{34}$ may be written as:

$$M\ddot{q}+D\dot{q}+Gq=F^T\tau+J_c^T f_c, \quad (3)$$

where $M \in \mathbb{R}^{34 \times 34}$ is the mass/inertia matrix, $D \in \mathbb{R}^{34 \times 34}$ is the damping matrix, $G \in \mathbb{R}^{34 \times 34}$ is the input coupling matrix, $\tau \in \nabla^{28}$ is the input vector, $J_c \in \mathbb{R}^{12 \times 34}$ is the contact Jacobian of both feet and $f_c \in \mathbb{R}^{12}$ is the generalized vector of contact forces for the feet. The contact constraints on the feet given by $J_c \dot{q} = 0 \in \mathbb{R}^{12}$ can be differentiated to get $$J_c \ddot{q} + \dot{J}_c \dot{q} = 0 \in \mathbb{R}^{12}. \quad (4)$$

The equations of motion in equation (3) can be re-written as:

$$\ddot{q}=-M^{-1}(D\dot{q}+Gq-F^T\tau-J_c^T f_c). \quad (5)$$

Solving for $f_c$ from equations (4) and (5) produces:

$$f_c=(J_c M^{-1} J_c^T)^{-1}[J_c M^{-1}(D\dot{q}+Gq-F^T\tau)-\dot{J}_c \dot{q}]. \quad (6)$$

Solving for $\ddot{q}$ from equations (5) and (6) gives:

$$\ddot{q}=-N_2 Gq-(N_2 D+N_1 \dot{J}_c)\dot{q}+N_2 F^T \tau, \quad (7)$$

where $N_1=M^{-1}J_c^T(J_c M^{-1} J_c^T)^{-1}$ and $N_2=(I_{34}-N_1 J_c)M^{-1}$. Here, $I_{34}$ is a 34×34 identity matrix. The state space matrices A and B of the resulting linear humanoid model with feet constraints and state vector $x=[q^T, \dot{q}^T] \in \mathbb{R}^{68}$ are given by:

$$A = \begin{bmatrix} 0_{34 \times 34} & I_{34} \\ -N_2 G & -(N_2 D + N_1 \dot{J}_c) \end{bmatrix} \in \mathbb{R}^{68 \times 68}, \quad (8)$$

$$B = \begin{bmatrix} 0_{34 \times 28} \\ N_2 F^T \end{bmatrix} \in \mathbb{R}^{68 \times 28},$$

where $0_{a \times b}$ is a a×b matrix with zeros as its elements and $I_{34}$ is a 34×34 identity matrix. In alternative embodiments, the full model state space matrices (or poles) used may be different, such that the robot is constrained in a manner other than to not move its feet. For example, rather than being constrained to not move its feet, the robot may be constrained to stand on one foot in one embodiment where the robot is walking or running.

The robot discussed above has 34 DOF and 12 constraints, which implies its net DOF is 22. A minimal state vector $x_m \in \mathbb{R}^{44}$ is obtained by finding a state transformation $U_m$ such that $x_m = U_m x$, where $U_m \in \mathbb{R}^{44 \times 68}$. The minimal state space realization is given by $\{A_m, B_m, C_m\}=\{U_m A U_m^T, U_m B, C U_m^T\}$. The minimal realization of a state space system can be obtained using Kalman decomposition.

At step 220, the simplification application receives task-specific output. In one embodiment, the task-specific output to be changed may be specified by a user as a desired output matrix $C \in \mathbb{R}^{p \times 68}$. The output matrix C may be chosen based on the task-specific output vector $y \in \mathbb{R}^p$. In this example, the output matrix $C=I_{68}$ may be used in an embodiment where the task is whole-body motion. Changing the task-specific output may affect the reduced-order system, as the changing of outputs results in a change in the transfer function and the way the transfer function is defined affects what data is retained and not retained. As discussed, complicated robot tasks such as manipulation intuitively require higher dimensional reduced order models than do simple tasks such as balancing. That is, the reduced order model is inherently task-specific. Experience has shown that, if a particular task to be performed is known beforehand, a corresponding task-specific output matrix may be used to derive a model that more robustly performs the particular task.

In an alternative embodiment, the user may specify the task-specific output in other forms, such as by specifying desired tasks or motions, and the simplification application may automatically determine the output matrix C. In some embodiments, the task-specific output may be specified as a vector of outputs (COM, angles in upper body, etc.). For example, task-specific outputs may be specified by a user as desired position and velocity of the center of mass (CoM) of the robot. In such a case, the simplification application may determine the output matrix C by computing the Jacobian of the CoM state vector $x_{com} \in \mathbb{R}^6$ with respect to the states of the original unconstrained system $x \in \mathbb{R}^{68}$. Persons skilled in the art will recognize that there may be different ways to compute such a Jacobian, including various analytical and numerical approaches.

At step 230, the simplification application determines a minimum stable balanced reduced model (and associated stabilizing controller) based on the task-specific output, the full dynamics model, and the controller. In one embodiment, the simplification application may determine the minimum stable balanced reduction and controller via an iterative linear search procedure. In such a case, the reduced order may be initialized to the number of unstable poles of the open-loop system {A, B, C}. While the closed-loop full-order system is unstable, the simplification application may apply a fractional balanced reduction technique to generate a balanced reduced system. If unstable closed-loop poles remain in the full-order system, when controlled using a stabilizing controller for the newly-generated balanced reduced system, the reduced order may be incremented, and fractional balanced reduction applied again to generate another balanced reduced system. Note, although discussed herein primarily with respect to a linear search, other types of searches on the order of the model may be used instead, such as a binary search.

Figure 3:
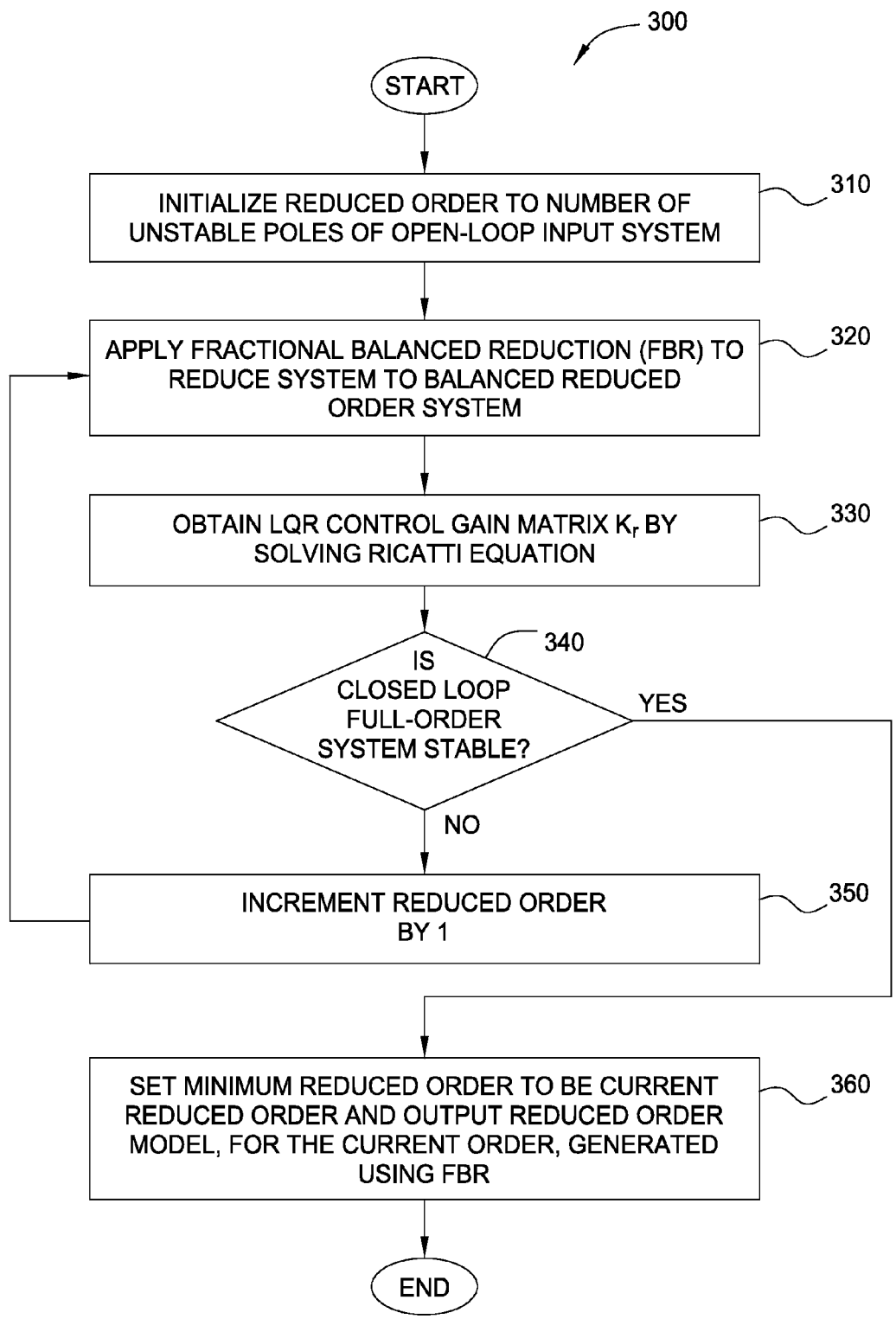
FIG. 3 illustrates a method for determining a minimum stable balanced reduced model and associated stabilizing controller, according to an embodiment of the invention.

FIG. 3 illustrates the method 300 for determining a minimum stable balanced reduced model and associated stabilizing controller, according to an embodiment. As shown, the method 300 begins at step 310, where the simplification application initializes a reduced order r to a number of unstable poles in open-loop system {A, B, C}. Doing so ensures the unstable subsystem is retained while reducing the model, in contrast to previous techniques in which the unstable subsystem was not necessarily retained as the user picked the reduced DOF.

At step 320, the simplification application applies fractional balanced reduction (FBR) to reduce the input system to a balanced reduced system having several states equal to the reduced order. Other approaches for reducing the system to the balanced reduced system may of course be used in lieu of FBR, such as the normalized coprime factorization method and balanced model truncation via square root method. Using FBR or the other approaches, the system {A, B, C} may be reduced to the system $\{A_r, B_r, C_r\}$. The reduced state transformation $T_r$ output from the FBR algorithm discussed above may be used to transform the symmetric LQR gain matrix on the full states $Q \in \mathbb{R}^{n \times n}$ to a symmetric LQR gain matrix on the reduced states $Q_r \in \mathbb{R}^{r \times r}$ with $Q_r = T_r Q T_r^T$. The user need only supply Q of the full states of a desired system, and the model reduction automatically generates $Q_r$ for each reduced r, which may be more intuitive than the user supplying $Q_r$ for the reduced states.

Further, the FBR technique reduces the system while minimizing the $H_\infty$ norm of the difference in the transfer functions of the full and reduced-order systems, i.e. $\|G-G_r\|_\infty$. Here, the transfer function deals with the effect of the inputs on the outputs. Note, the inputs and outputs for the reduced-order system are the same as those of the full system. Roughly speaking, the FBR technique reduces the difference in energy transfer from the inputs to the outputs, which implies that the output matrix $C \in \mathbb{R}^{p \times n}$ that maps the states to the outputs also plays an important role in model reduction. This is the intuition behind making the output matrix C that influences the transfer function task-specific.

At step 330, the simplification application obtains an LQR control gain matrix $K_r$ for the reduced system by solving the Riccati equation in Table 1. The LQR gain matrix on the control inputs $R \in \mathbb{R}^{m \times m}$ which are received from a user may remain unchanged, as the control inputs remain the same for the reduced-order model. Here, the stabilizing control law is given by $u = -K_r x_r$, where the control gain matrix $K_r = R^{-1} B_r^T S \in \mathbb{R}^{m \times r}$, and S is obtained by solving the associated Riccati equation.

At step 340, the simplification application determines whether the closed-loop full-order system is stable. Since the reduced state is $x_r = T_r x$, the resulting control law for the full-order system is given by $u = -K_r T_r x$. The eigenvalues $\lambda$ of the closed-loop transition matrix $A_{cl} = (A - B K_r T_r)$ determine the stability of the closed-loop full-order system, where positive eigenvalues form the set of unstable poles $p_{unstab}$.

If the simplification application determines at step 340 that the closed-loop full-order system is unstable, then at step 350, the simplification application increments the reduced order r by one, after which the method 300 returns to step 320. If, however, the simplification application determines that the closed-loop full-order system is stable, then the minimum reduced order is taken as the current reduced order r at step 360, and the reduced system $\{A_r, B_r, C_r\}$ for the current reduced order is taken as the minimum reduced system.

In one embodiment, the method 300 for determining a minimum stable balanced reduced model may be implemented according to the pseudocode of Table 1:

TABLE 1

| | |
|---|---|
| input | : System {A, B, C}, LQR Gains Q, R |
| output | : Minimum stable Reduced Order $r_{min}$ |
| | Reduced System $\{A_r, B_r, C_r\}$ |
| | Reduced State Transformation $T_r$ |
| | Control Gain Matrix $K_r$ |
| function | : $[r_{min}, A_r, B_r, C_r, T_r, K_r]$ = MSR(A, B, C) |
| begin | |
| | Get the unstable open-loop poles and initialize r |
| | $p_{unstab} = \{\lambda_i | \lambda_i \in \lambda(A) > 0\} p$ |
| | r = size($p_{unstab}$) |
| | while $p_{unstab} \neq \phi$ and $r \leq n$ do |
| | Get balanced truncated system $\{A_r, B_r, C_r\}$ |
| | $[A_r, B_r, C_r, T_r]$ = FBR(A, B, C, r) |
| | Get LQR control gain matrix $K_r$ with $Q_r = T_r Q T_r^T$ |
| | and $R_r = R$ by solving its associated Riccati equation |
| | $A_r^T S + S A_r - S B_r R_r^{-1} B_r^T S + Q_r = 0$ |
| | $K_r = R_r^{-1} B_r^T S$ |
| | Get the unstable closed-loop poles $p_{unstab}$ |
| | $p_{unstab} = \{\lambda_i | \lambda_i \in \lambda(A - B K_r T_r) > 0\}$ |
| | r = r + 1 |
| end | |
| | Get the minimum reduced system $\{A_r, B_r, C_r\}$ |
| | $r_{min}$ = r - 1 |
| | $[A_r, B_r, C_r, T_r]$ = FBR(A, B, C, $r_{min}$) |
| end | |

Here, FBR stabilizes an unstable system, balances and truncates the stabilized system, and then retrieves the reduced unstable system. A system with state space realization {A, B, C} may be stabilized using the change of input $\bar{u} = Kx - u$, where $K = -B^T N$ and N is the solution to an algebraic Riccati equation $A^T N + NA - NBB^T N + C^T C = 0$. The statespace equations for this stabilized system are given by:

$$\dot{x} = \bar{A}x + B\bar{u}, \begin{bmatrix} y \\ u \end{bmatrix} = \begin{bmatrix} C \\ K \end{bmatrix} x + \begin{bmatrix} 0 \\ I \end{bmatrix} u. \quad (9)$$

The stable state space realization $$\left\{ \bar{A}, B, \begin{bmatrix} C \\ K \end{bmatrix} \right\}$$

in equation (9) may be balanced and truncated, using a balanced truncation approach discussed below, to $$\left\{ \bar{A}_r, B_r, \begin{bmatrix} C_r \\ K_r \end{bmatrix} \right\}.$$

The reduced system $\{A_r, B_r, C_r\}$ of the original unstable system $\{A, B, C\}$ is obtained by undoing the effects of the stabilizing controller K with $A_r=\overline{A}_r-B_rK_r$. In one embodiment, FBR may be implemented according to the pseudocode of Table 2:

TABLE 2

```
input     : System {A, B, C}, Reduced Order r
output    : Reduced System {A_r, B_r, C_r}
            Reduced State Transformation T_r
function  : [A_r, B_r, C_r, T_r] = FBR(A, B, C, r)
begin
    Solve algebraic Riccati equation
        A^T N + NA − NBB^T N + C^T C = 0
    Get stabilized system {Ā, B̄, C̄}
        Ā = A + BK, where K = −B^T N
        B̄ = B
        C̄ = [C]
              [K]

Get balanced truncated system {Ā_r, B̄_r, C̄_r}
        [Ā_r, B̄_r, C̄_r, T_r] = BT(Ā, B̄, C̄, r)
    Retrieve the reduced system {A_r, B_r, C_r}
        K_r = C̄_r(p + 1:p + m, 1:r)
        A_r = Ā_r − B̄_r K_r
        B_r = B̄_r
        C_r = C̄_r(1:p, 1:r)
end
```

In Table 2, BT is a balanced truncation operation, such as the square-root method for balanced truncation. As its name indicates, balanced truncation includes two steps: balancing the system, and truncating the balanced system. A stable system of the form shown in equation (1) is said to be balanced if its controllability gramian $P \in \mathbb{R}^{n \times n}$ and observability gramiam $Q \in \mathbb{R}^{n \times n}$ are equal and diagonal positive definite matrices, i.e., $P=Q=\Sigma>0$. This implies each balanced state is equally controllable and observable. The balanced state vector is given by $x_b=T_b x$. A measure of controllability and observability of each state may be obtained from its Hankel singular value. The Hankel singular values of a balanced system with controllability and observability gramians $P_b$ and $Q_b$ is given by $\sigma_{HSV}=\sqrt{\lambda(P_b Q_b)}$, where $\lambda(\cdot)$ computes the eigenvalues. The largest Hankel singular values correspond to the most controllable and observable states, whereas the smallest singular values correspond to the least controllable and observable states. Therefore, to reduce the system with n states in equation (1) to a system with r states in equation (2), one can pick the r most controllable and observable states from its balanced state vector $x_b$. The reduced state vector is given by $x_r=T_r x$. In one embodiment, balanced truncation may be implemented according to the pseudocode of Table 3:

TABLE 3

```
input     : System {A, B, C}, Reduced Order r
output    : Reduced System {A_r, B_r, C_r}
            Reduced State Transformation T_r
function  : [A_r, B_r, C_r, T_r, T_n] = BT (A, B, C, r)
begin
    Solve Lyapunov equations to get controllability and observability
    gramians P, Q
        AP + PA^T + BB^T = 0
        A^T Q + QA + C^T C = 0
    Find Cholesky factors L_P and L_Q
        L_p = U_p √S_p, where P = U_p S_p V_p^T
        L_q = U_q √S_q, where Q = U_q S_q V_q^T
    Get singular value decomposition of L_q^T L_q
        L_q^T L_q = U_b S_b V_b^T
```

TABLE 3-continued

```
    Get balanced transformation matrices
        T_1 = L_q U_b S_b^{−1/2}
        T_2 = L_p U_b S_b^{−1/2}
    Get balanced state transformation
        T_b = T_2^{−1} ∈ ℝ^{n×n}
    Get reduced transformation matrices
        T_3 = T_1(1:n, 1:r) ∈ ℝ^{n×r}
        T_4 = T_2 (1:n, 1:r) ∈ ℝ^{n×r}
    Get reduced system
        A_r = T_3^T A T_4
        B_r = T_3^T B
        C_r = C T_4
    Get reduced state transformation
        T_r = T_b (1:r, 1:n) ∈ ℝ^{r×n}
end
```

Figure 4:
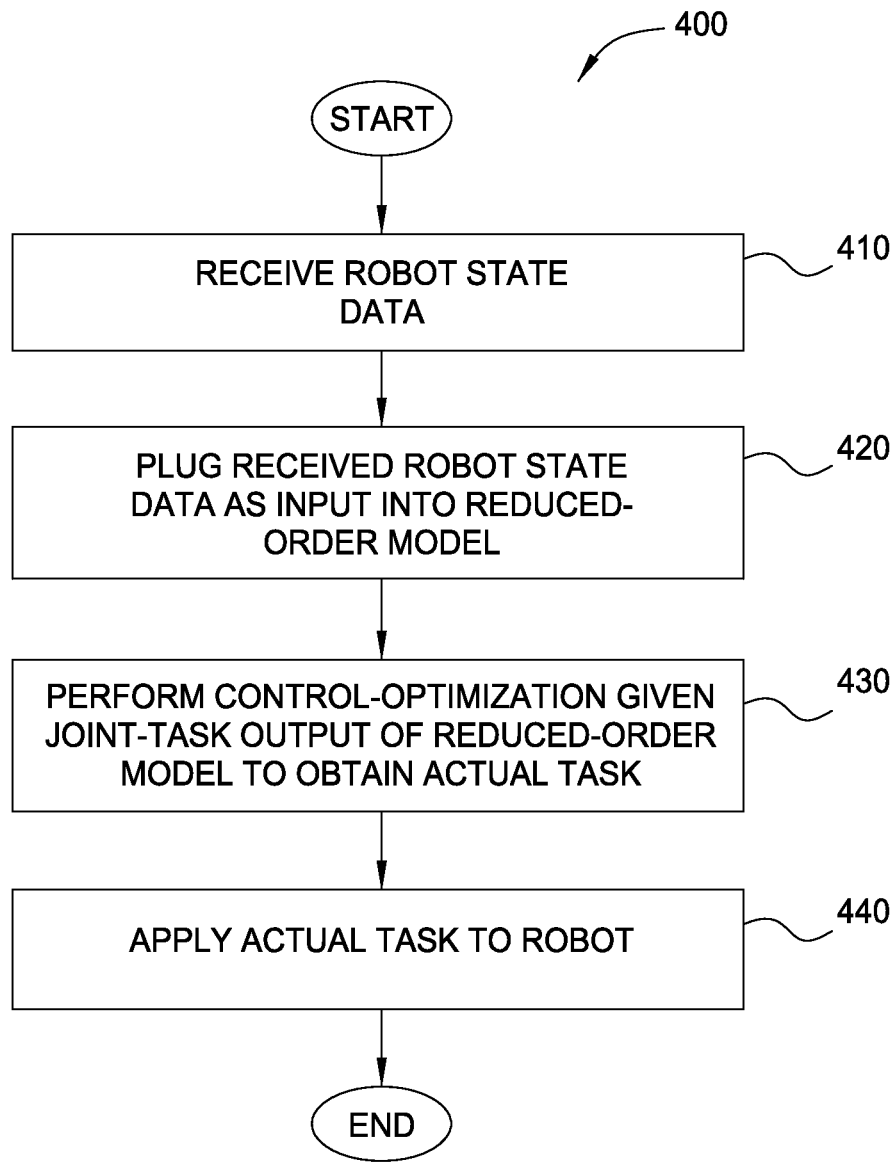
FIG. 4 illustrates a method for controlling a robot to perform a motion using a simplified dynamics model, according to an embodiment of the invention.

FIG. 4 illustrates a method for controlling a robot to perform a motion using a simplified dynamics model, according to an embodiment. As shown, the method 400 begins at step 410, where the robot control application receives robot state data. In one embodiment, a state observer with gain matrix $L_r \in \mathbb{R}^{r \times r}$, which may be designed using, e.g., pole-placement techniques, may be provide the full-state measurement data, including joint angles and joint velocities. In such a case, the state space equations for the reduced-order model with the observer and its control law are:

$$\dot{\hat{x}}_r = A_r \hat{x}_r + B_r u + L_r (x_r^{meas} - \hat{x}_r)$$

$$u = -K_r \hat{x}_r, \quad (10)$$

where $\hat{x}_r \in \mathbb{R}^r$ is the reduced state estimate, $x_r^{meas}=T_r U_m (x_d - x^{meas}) \in \mathbb{R}^r$ is the reduced state measurement, $x^{meas} \in \mathbb{R}^{68}$ is the full state measurement of the robot, $x_d \in \mathbb{R}^{68}$ is the desired state vector of the robot, $K_r \in \mathbb{R}^{28 \times r}$ is the LQR control gain matrix, $T_r \in \mathbb{R}^{r \times 44}$ is the reduced state transformation matrix that transforms the minimal states into the reduced states, and $U_m \in \mathbb{R}^{44 \times 68}$ is the minimal state transformation matrix that transforms the original states into the minimal states of the constrained system.

At step 420, the robot control application plugs the received robot state data as input into the reduced-order model. In one embodiment, the reduced-order model may be a minimum stable balanced reduced model generated according to the method 300 discussed with FIG. 3, and the inputs and outputs of the reduced model system are the same as those of the full model system from which the reduced model was generated. In such a case, the received robot state data may be used as input into equation (10). Doing so permits the robot control application to estimate the reduced states $\hat{x}_r$, which in turn may be used to obtain the control input u corresponding to the joint task to apply to the robot.

As discussed, the reduced-order model generated according to the method 300 has the same control inputs as the full model, so the LQR controller of the reduced-order model may be used directly to control the full model. However, sometimes, direct control of the nonlinear simulation of the humanoid robot may not be successful. As discussed, if the reduced models are obtained by using only a subset of the robot states as outputs, the controllers designed to stabilize these models may outweigh some robot states over another, which results in poor tracking of reference trajectories for the individual joints. Further, the controllers may produce excessive or insufficient contact forces in the feet, and also generate non-zero contact acceleration of the feet. To overcome these issues, control optimization may be performed to find joint torques τ and contact forces $f_c$ that satisfy desired constraints and also achieve the desired task.

At step 430, the robot control application performs control optimization given the joint task output of the reduced-order model to obtain an actual joint task. In one embodiment, the control optimization may use quadratic programming to minimize a cost function. In such a case, the cost-function may include a cost term which corresponds to the output of the reduced-order model. The cost function may have form:

$$Z = Z_u + Z_q + Z_c + Z_\tau + Z_c. \tag{11}$$

Here, the cost on the difference between the output of the LQR controller in equation (10) and the joint torques $\tau$ is given by:

$$Z_u = \frac{1}{2}(u-\tau)^T W_u (u-\tau), \tag{12}$$

where $W_u$ is a constant weight matrix.

The term $Z_q$ is the cost associated with achieving desired joint accelerations to track the reference joint trajectories. The desired joint accelerations are given by:

$$\ddot{q}_d = \ddot{q}_{ref} + K_d(\dot{q}_{ref} - \dot{q}) + K_p(q_{ref} - q), \tag{13}$$

where $K_p$, $K_d > 0$. Further, the cost $Z_q$ is given by:

$$Z_q = \frac{1}{2}(\ddot{q}_d - \ddot{q})^T W_q (\ddot{q}_d - \ddot{q}), \tag{14}$$

where $W_q$ is a constant weight matrix. From equation (3), equation (14) can be re-written as:

$$Z_q = \frac{1}{2}\begin{bmatrix}\tau\\f_c\end{bmatrix}^T A_q \begin{bmatrix}\tau\\f_c\end{bmatrix} - \begin{bmatrix}\tau\\f_c\end{bmatrix}^T b_q + c_q, \tag{15}$$

where $A_q = a_q^T W_q a_q$, $b_q = a_q^T W_q (b_q + \ddot{q}_d)$, $c_q = \frac{1}{2}(b_q - \ddot{q}_d)^T W_d (b_q - \ddot{q}_d)$, $a_q = M^{-1}[F^T, J_c^T]$, and $b_q = M^{-1}(C\dot{q} + Gq)$.

The cost associated with achieving zero contact acceleration $\ddot{r}_c$ of the feet, which is optional, may be given by:

$$Z_c = \frac{1}{2}\ddot{r}_c^T W_c \ddot{r}_c, \tag{16}$$

where $\ddot{r}_c = J_c\ddot{q} + \dot{J}_c\dot{q}$ and $W_c$ is a constant weight matrix. Similar to equation (15), equation (16) can be re-written as:

$$Z_c = \frac{1}{2}\begin{bmatrix}\tau\\f_c\end{bmatrix}^T A_c \begin{bmatrix}\tau\\f_c\end{bmatrix} - \begin{bmatrix}\tau\\f_c\end{bmatrix}^T b_c + c_c, \tag{17}$$

where $A_c = a_q^T J_c^T W_c J_c a_q$, $b_c = a_q^T J_c^T W_c (J_c b_q - \dot{J}_c \dot{q})$, $c_q = \frac{1}{2}(J_c b_q + \dot{J}_c \dot{q})^T W_c (J_c b_q + \dot{J}_c \dot{q})$, $a_q = M^{-1}[F^T, J_c^T]$, and $b_q = M^{-1}(C\dot{q} + Gq)$.

The costs associated with minimizing joint torques and contact forces are given by:

$$Z_\tau = \frac{1}{2}\tau^T W_\tau \tau, \tag{18}$$

$$Z_c = \frac{1}{2}f_c^T W_f f_c, \tag{19}$$

where $W_\tau$ and $W_f$ are constant weight matrices.

With equations (12)-(19), the cost function Z of equation (11) can be re-written in quadratic form as:

$$Z = \frac{1}{2}\begin{bmatrix}\tau\\f_c\end{bmatrix}^T A \begin{bmatrix}\tau\\f_c\end{bmatrix} - \begin{bmatrix}\tau\\f_c\end{bmatrix}^T b + c, \tag{20}$$

where, $A = A_q + A_c + \begin{bmatrix}W_u + W_\tau & 0\\ 0 & W_f\end{bmatrix}$, $b = b_q + b_c + \begin{bmatrix}W_u u\\ 0\end{bmatrix}$, $$c = c_q + c_c + u^T W_u u. \tag{21}$$

This optimization problem has an analytic solution given by:

$$\begin{bmatrix}\tau\\f_c\end{bmatrix}^* = A^{-1} b. \tag{22}$$

Note, this optimization does not directly enforce constraints on contact forces or other hardware limitations in joint velocities, accelerations and torques. Such constraints can be added as inequality constraints to the optimization, in which case the solution may require, e.g., a constrained gradient descent optimization approach or another optimization approach, rather than the analytic solution in equation (22).

At step 440, the robot control application applies the actual joint task to the robot. That is, joint torques which make up the actual joint task are sent to joint controllers of a robot being modeled to cause the robot to move. The robot motions may include balancing, arm swinging, hip rocking, and roll motion tasks, among others.

Figure 5:
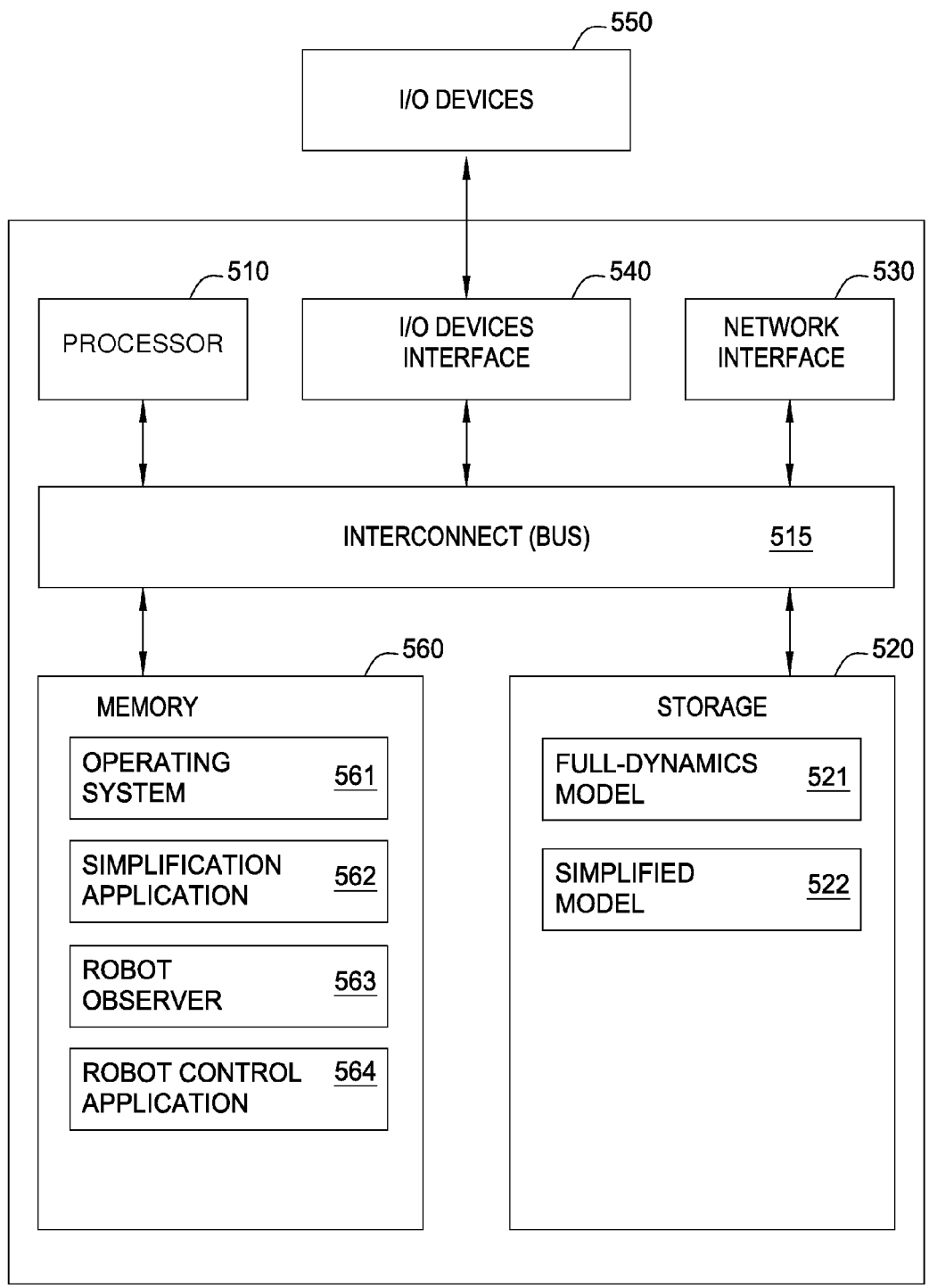
FIG. 5 depicts a block diagram of a system in which an embodiment may be implemented.

FIG. 5 depicts a block diagram of a system in which an embodiment is implemented. As shown, the system 500 includes, without limitation, a processor (e.g., such as a central processor unit or CPU, a microcontroller, application specific circuitry or the like) 510, a network interface 530, an interconnect 515, a memory 560 and storage 520. The system 500 may also include an I/O device interface 540 connecting I/O devices 550 (e.g., keyboard, display and mouse devices) to the system 500. The I/O devices 540 and 550 may include a joint controller capable of configuring the articulated link positions of a humanoid robot by modifying the angles of joints of the humanoid robot.

Processor 510 retrieves and executes instructions and data stored in the memory 560. The interconnect 515 facilitates transmission, such as of instructions and data, between the processor 510, I/O device interface 540, storage 520, network interface 530, and memory 560. Processor 510 may be implemented by a single CPU, multiple CPUs, a single CPU having multiple processing cores, and the like. Memory 560 may be implemented by a random access memory. The storage 520 may be implemented by disk drive storage device. Although shown as a single unit, the storage 520 may combine fixed and/or removable storage devices, such as fixed disc drives, solid state drives (SSD), tape drives, removable memory cards or optical storage, network attached storage (NAS), or a storage area-network (SAN). Further, system 500 may be implemented by a physical computing system or, alternatively, virtual machine instances hosted on a set of underlying physical computing systems. Further still, although shown as a single computing system, one of ordinary skill in the art will recognized that the components of the system 500 in FIG. 5 may be distributed across multiple computing systems connected by a data communications network. Also, the functions of controlling the joint articulation of a robot may be separate from the systems and applications described herein used to simplify full dynamics models, and are included in system 500 for ease of understanding.

As shown, the memory 560 includes an operating system 561 and applications 562-564. Illustratively, the operating system may include Microsoft's Windows®. The applications 562-564 include a simplification application 562, which is configured to simplify a full-dynamics model 521 into a simplified model 522 having fewer states than the full dynamics model 521. In one embodiment, the simplification application 562 may be configured to generate the simplified model 522 as a task-specific minimum stable balanced reduced model, according to the methods 200-300. The applications 562-564 also include a robot observer 563 which takes measurements of the state of the robot. Such state measurement data may be transmitted to a robot control application 565, which may be configured to input the robot state into the simplified model 522 and perform control optimization on the joint task output of the simplified model 522 to determine an actual task, including joint torques, to apply to a robot. The robot control application 564 may be configured to signal the robot indicating the joint torques to exert. That is, the robot control application 564 may convert calculated joint torques to instructions sent to the robot, thereby causing joints of the robot to move according to those instructions. In one embodiment, the robot control application 564 may utilize the simplified model 522, perform control optimization, signal the robot, etc. according to the method 400 discussed above.

Advantageously, techniques disclosed herein permit full dynamics models of robots to be simplified. Conventionally, the controller developer must decide which mechanical model represents essential properties of dynamics of a robot, and to pick mappings that map the state of the full model to the reduced state and that map the control inputs of the reduced model to those of the full model. By contrast, techniques described herein may be automated once, e.g., the full system and LQR gains are specified. Further, techniques disclosed herein find the smallest reduced-order system whose stabilizing control stabilizes the original high-dimensional system. By formulating the original system with task-specific outputs, the minimum stable balanced reduction approach may be made task-specific. An optimization framework is disclosed which uses task-specific minimum stable balanced reduced-order models to control a high-dimensional nonlinear robot model.

While the foregoing is directed to aspects of the present invention, other and further aspects of the invention may be devised without departing from the basic scope thereof, and the scope thereof is determined by the claims that follow.

What is claimed is:

1. A computer-implemented method for simplifying a model of a robot, comprising:
    receiving the robot model and a controller, wherein the received robot model includes one or more equations with mass and dynamic properties of the robot used to simulate motion of the robot, and wherein the received controller is configured to compute inputs to the received robot model for achieving one or more control objectives;
    receiving task-specific output corresponding to a task or motion to be performed; and
    performing, via one or more processors, a search on an order of the received robot model to obtain a minimum stable reduced order robot model and a first stabilizing controller associated therewith given the received robot model, the received controller, and the received task-specific output, wherein the first stabilizing controller also stabilizes the received robot model, and wherein the search includes:
        initializing a reduced order to a number of unstable poles of an open-loop system of the received robot model,
        reducing the received robot model to a balanced reduced order robot model,
        obtaining a second stabilizing controller associated with the balanced reduced order robot model and capable of controlling the received robot model,
        if a closed loop of the received robot model with the second stabilizing controller is unstable, incrementing the reduced order and repeating the steps of reducing the received robot model and obtaining the second stabilizing controller, and
        if the closed loop of the received robot model with the second stabilizing controller is stable, taking the balanced reduced order robot model to be the minimum stable reduced order robot model and the second stabilizing controller to be the first stabilizing controller.

2. The method of claim 1,
    wherein the search is one of an iterative linear search and a binary search,
    wherein the received robot model is reduced to the balanced reduced order robot model by applying a fractional balanced reduction (FBR), and
    wherein obtaining the second stabilizing controller associated with the balanced reduced order robot model includes obtaining a linear quadratic regulator (LQR) gain control matrix by solving a Riccati equation.

3. The method of claim 1, further comprising:
    receiving state data of the robot;
    inputting the received state data into the minimum stable reduced order robot model to obtain a first joint task;
    performing control optimization given the first joint task to obtain a second joint task; and
    applying the second joint task to the robot.

4. The method of claim 3, wherein the control optimization uses quadratic programming to minimize a cost function which includes a cost term corresponding to an output of the minimum stable reduced order robot model.

5. The method of claim 4, wherein the cost term corresponding to the output of the minimum stable reduced order robot model has form $$Z_u = \frac{1}{2}(u - \tau)^T W_u (u - \tau),$$

where u represents output of a linear quadratic regulator (LQR) controller, $W_u$ represents a constant weight matrix, $\tau$ represents joint torques, and $Z_u$ represents a cost on a difference between the output of the LQR controller and the joint torques.

6. The method of claim 1, wherein the received task-specific output includes an output matrix.

7. The method of claim 6, wherein the output matrix is an identity matrix, and wherein the task is whole-body motion.

8. The method of claim 1, wherein the received task-specific output includes a position and a velocity of a center of mass (CoM) of the robot, and wherein the method further comprises:
   determining an output matrix by computing a Jacobian of a CoM state vector with respect to states of an unconstrained system of the received robot model.

9. The method of claim 1, wherein the received robot model is specified by state-space matrices, and wherein the received controller is specified as one of a linear quadratic regulator (LQR) gain matrix on full states or closed-loop poles and pole placement.

10. A non-transitory computer-readable storage media storing instructions, which when executed by a computer system, perform operations for simplifying a model of a robot, the operations comprising:
   receiving the robot model and a controller, wherein the received robot model includes one or more equations with mass and dynamic properties of the robot used to simulate motion of the robot, and wherein the received controller is configured to compute inputs to the received robot model for achieving one or more control objectives;
   receiving task-specific output corresponding to a task or motion to be performed; and
   performing a search on an order of the received robot model to obtain a minimum stable reduced order robot model and a first stabilizing controller associated therewith given the received robot model, the received controller, and the received task-specific output, wherein the first stabilizing controller also stabilizes the received robot model, and wherein the search includes:
      initializing a reduced order to a number of unstable poles of an open-loop system of the received robot model,
      reducing the received robot model to a balanced reduced order robot model,
      obtaining a second stabilizing controller associated with the balanced reduced order robot model and capable of controlling the received robot model,
      if a closed loop of the received robot model with the second stabilizing controller is unstable, incrementing the reduced order and repeating the steps of reducing the received robot model and obtaining the second stabilizing controller, and
      if the closed loop of the received robot model with the second stabilizing controller is stable, taking the balanced reduced order robot model to be the minimum stable reduced order robot model and the second stabilizing controller to be the first stabilizing controller.

11. The computer-readable storage media of claim 10, wherein the search is one of an iterative linear search and a binary search,
   wherein the received robot model is reduced to the balanced reduced order robot model by applying a fractional balanced reduction (FBR), and
   wherein obtaining the second stabilizing controller associated with the balanced reduced order robot model includes obtaining a linear quadratic regulator (LQR) gain control matrix by solving a Riccati equation.

12. The computer-readable storage media of claim 10, the operations further comprising:
   receiving state data of the robot;
   inputting the received state data into the minimum stable reduced order robot model to obtain a first joint task;
   performing control optimization given the first joint task to obtain a second joint task; and
   applying the second joint task to the robot.

13. The computer-readable storage media of claim 12, wherein the control optimization uses quadratic programming to minimize a cost function which includes a cost term corresponding to an output of the minimum stable reduced order robot model.

14. The computer-readable storage media of claim 13, wherein the cost term corresponding to the output of the minimum stable reduced order robot model has form $$Z_u = \frac{1}{2}(u-\tau)^T W_u (u-\tau),$$

where u represents output of a linear quadratic regulator (LQR) controller, $W_u$ represents a constant weight matrix, $\tau$ represents joint torques, and $Z_u$ represents a cost on a difference between the output of the LQR controller and the joint torques.

15. The computer-readable storage media of claim 10, wherein the received task-specific output includes an output matrix.

16. The computer-readable storage media of claim 15, wherein the output matrix is an identity matrix, and wherein the task is whole-body motion.

17. The computer-readable storage media of claim 10, wherein the received task-specific output includes a position and a velocity of a center of mass (CoM) of the robot, and wherein the operations further comprise:
   determining an output matrix by computing a Jacobian of a CoM state vector with respect to states of an unconstrained system of the received robot model.

18. The computer-readable storage medium of claim 10, wherein the received robot model is specified by state-space matrices, and wherein the received controller is specified as one of a linear quadratic regulator (LQR) gain matrix on full states or closed-loop poles and pole placement.

19. A system, comprising:
   a processor; and
   a memory, wherein the memory includes an application program configured to perform operations for simplifying a model of a robot, the operations comprising:
      receiving the robot model and a controller, wherein the received robot model includes one or more equations with mass and dynamic properties of the robot used to simulate motion of the robot, and wherein the received controller is configured to compute inputs to the received robot model for achieving one or more control objectives,
      receiving task-specific output corresponding to a task or motion to be performed, and
      performing a search on an order of the received robot model to obtain a minimum stable reduced order robot model and a first stabilizing controller associated therewith given the received robot model, the received controller, and the received task-specific output, wherein the first stabilizing controller also stabilizes the received robot model, and wherein the search includes:
 initializing a reduced order to a number of unstable poles of an open-loop system of the received robot model;
 reducing the received robot model to a balanced reduced order robot model;
 obtaining a second stabilizing controller associated with the balanced reduced order robot model and capable of controlling the received robot model;
 if a closed loop of the received robot model with the second stabilizing controller is unstable, incrementing the reduced order and repeating the steps of reducing the received robot model and obtaining the second stabilizing controller; and
 if the closed loop of the received robot model with the second stabilizing controller is stable, taking the balanced reduced order robot model to be the minimum stable reduced order robot model and the second stabilizing controller to be the first stabilizing controller.

20. The system of claim 19,
 wherein the search is one of an iterative linear search and a binary search,
 wherein the received robot model is reduced to the balanced reduced order robot model by applying a fractional balanced reduction (FBR), and
 wherein obtaining the second stabilizing controller associated with the balanced reduced order robot model includes obtaining a linear quadratic regulator (LQR) gain control matrix by solving a Riccati equation.

* * * * *

UNITED STATES PATENT AND TRADEMARK OFFICE
CERTIFICATE OF CORRECTION

PATENT NO. : 9,579,796 B2
APPLICATION NO. : 14/037183
DATED : February 28, 2017
INVENTOR(S) : Umashankar Nagarajan et al.

It is certified that error appears in the above-identified patent and that said Letters Patent is hereby corrected as shown below:

In Column 5, Line 51, delete "$\bar{t} \in \bar{V}^{28}$" and insert -- $t \in \mathbb{R}^{28}$ --, therefor.

In Column 9, Line 35, delete "gramiam" and insert -- gramian --, therefor.

In Column 16, Line 44, in Claim 18, delete "medium" and insert -- media --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*